United States Patent
Hartmann et al.

(10) Patent No.: US 9,556,963 B2
(45) Date of Patent: Jan. 31, 2017

(54) OVERPRESSURE VALVE IN THE FORM OF A CHECK VALVE

(71) Applicant: Schaeffler Technologies AG & Co. KG, Herzogenaurach (DE)

(72) Inventors: Christian Hartmann, Falkendorf (DE); Petrus Hubertus Kroon, Furth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/427,138

(22) PCT Filed: May 23, 2013

(86) PCT No.: PCT/EP2013/060609
§ 371 (c)(1),
(2) Date: Mar. 10, 2015

(87) PCT Pub. No.: WO2014/040764
PCT Pub. Date: Mar. 20, 2014

(65) Prior Publication Data
US 2015/0226345 A1 Aug. 13, 2015

(30) Foreign Application Priority Data
Sep. 11, 2012 (DE) .................. 10 2012 216 056

(51) Int. Cl.
F16K 15/04 (2006.01)
F16K 17/04 (2006.01)
F16H 7/08 (2006.01)

(52) U.S. Cl.
CPC ......... *F16K 15/044* (2013.01); *F16K 17/0406* (2013.01); *F16H 2007/0806* (2013.01); *F16H 2007/0814* (2013.01); *F16H 2007/0859* (2013.01); *Y10T 137/7927* (2015.04); *Y10T 137/7931* (2015.04)

(58) Field of Classification Search
CPC ................ F16H 2007/0806; F16H 2007/0814; F16H 2007/0859; F16K 17/0406
USPC ............................. 137/539, 543.17, 543.19
See application file for complete search history.

(56) References Cited

U.S. PATENT DOCUMENTS

| 5,643,117 A | 7/1997 | Dembosky |
| 6,193,623 B1 | 2/2001 | Koch et al. |

(Continued)

FOREIGN PATENT DOCUMENTS

| CN | 1769742 | 5/2006 |
| CN | 101006288 | 7/2007 |

(Continued)

*Primary Examiner* — Kevin L. Lee
*Assistant Examiner* — P. Macade Nichols
(74) *Attorney, Agent, or Firm* — Volpe and Koenig, P.C.

(57) ABSTRACT

The invention relates to an overpressure valve (1) which is in the form of a one-way valve or a check valve and which includes a pot-shaped housing (2) with a base (3) and central opening (4) and which also has a valve seat (6) which interacts with a spring-loaded closing body (7). A guide sleeve (9) is inserted with a force fit or form fit into the housing (2) for the purpose of receiving a compression spring (8) which exerts a load on the closing body (7), which guide sleeve simultaneously ensures a construction of the overpressure valve (1) which is secured against falling apart.

10 Claims, 2 Drawing Sheets

(56) References Cited

U.S. PATENT DOCUMENTS

| | | | |
|---|---|---|---|
| 6,352,487 B1 * | 3/2002 | Tada | F01L 1/02 |
| | | | 474/110 |
| 6,435,993 B1 | 8/2002 | Tada | |
| 6,550,698 B2 * | 4/2003 | Ness | F16K 21/08 |
| | | | 239/132 |
| 7,174,799 B2 | 2/2007 | Yoshida et al. | |
| 7,775,924 B2 | 8/2010 | Koch | |
| 7,871,251 B2 | 1/2011 | Marino et al. | |
| 2007/0270259 A1 | 11/2007 | Koch | |
| 2008/0292473 A1 | 11/2008 | Marino et al. | |
| 2010/0004080 A1 | 1/2010 | He | |
| 2012/0145248 A1 | 6/2012 | Huff et al. | |

FOREIGN PATENT DOCUMENTS

| | | |
|---|---|---|
| CN | 101375091 | 2/2009 |
| CN | 202165539 | 3/2012 |
| CN | 102472411 | 5/2012 |
| DE | 4133560 | 5/1992 |
| DE | 19651089 | 6/1997 |
| DE | 60027227 | 8/2006 |
| EP | 0483564 | 5/1992 |
| JP | 2004176821 | 6/2004 |

* cited by examiner

OVERPRESSURE VALVE IN THE FORM OF A CHECK VALVE

BACKGROUND

The invention relates to an overpressure valve which is in the form of a one-way valve or a check valve and which comprises a pot-shaped housing with a base and central opening and which also comprises a valve seat which interacts with a spring-loaded closing body.

In various mechanical engineering applications in which individual parts or assemblies are exposed to a pressure from a medium, precautions must be taken so that limit loads are not exceeded in the pressure-loaded areas. In the state of the art, for protection from loads that are too high, it is known to use overpressure valves in hydraulic systems, wherein these valves open when a limiting pressure is reached and discharge a partial flow of the hydraulic fluid via a bypass or a discharge channel.

For example, for a hydraulic tensioning device of a traction mechanism drive, in particular, a chain drive, it is necessary to limit the medium pressure to prevent a load that is too high on the traction mechanism, in order to keep the friction and wear low. For reducing the pressure, overpressure valves are used. For example, in DE 41 33 560 A1 and U.S. Pat. No. 6,193,623, hydraulic tensioning devices are shown and described in which overpressure valves are used to prevent high tensioning pressures. Another tensioning device is disclosed in DE 600 27 227 T2 that relates to a hydraulic chain tensioning device that includes an overpressure valve. Here, in a flow path there is a stepped hole in which a ball is arranged that is pretensioned with a spring in the direction of the hole axis and can form a sealing contact on a sealing seat. If the pressure increases in a compression space, the media pressure acts on the spring-tensioned closing ball and attempts to press the ball against the spring force. If this pressure is high enough, i.e., the pressure difference in the adjacent compression spaces is sufficiently large and exceeds the spring force of the closing ball, then this leads to pressure equalization. If the pressure difference decreases, the spring presses the closing ball back against the sealing seat, forming a seal, wherein the overpressure valve closes.

SUMMARY

The invention is based on the objective of creating a hydraulic overpressure valve that is optimized in terms of components and has a simple construction and also can be assembled safely and reliably and can be produced economically.

This objective is met with an overpressure valve having one or more features of the invention. Preferred constructions of the invention are listed below and in the claims.

According to the invention, to realize a construction in the housing of the overpressure valve that is secure from falling apart, a guide sleeve is inserted flush with a force fit that is designed for receiving a compression spring applying a load on the closing body. The guide sleeve is preferably held by means of an interference fit and/or form fit or without additional securing means permanently in the guide sleeve or in the housing. Advantageously, in comparison to previously used overpressure valves, additional processing steps are eliminated and additional components for securing individual components are spared. The guide sleeve also offers the ability to use longer and thus stronger compression springs for directly affecting the opening characteristics of the overpressure valve. Furthermore, the construction of the overpressure valve according to the invention, which is secure from falling apart, simplifies the transport and storage of the valve. In conventional overpressure valves, the valve seat is usually realized by another separate component that is eliminated in the overpressure valve according to the invention, because the closing body is allocated on one side to the compression spring and on the other side to the valve seat.

Through the use of the guide sleeve also designated as a receptacle body for the compression spring, a component-optimized overpressure valve limited to four components— the housing, the closing body, the compression spring, and the guide sleeve—can be realized. The guide sleeve that is also designated as a receptacle body provides an exact guidance of the compression spring, wherein an alignment or balancing of the closing body that is supported on the compression spring on the end with a form fit is simultaneously eliminated in the direction of the valve seat, which has an advantageous effect on the function of the overpressure valve.

Due to the simpler construction of the overpressure valve, advantageously the costs for producing the required individual components can be reduced. In addition, the guide sleeve allows, in connection with the inserted compression spring, a simplified, shortened, secure assembly. For further reducing the assembly costs, it is possible to use an assembly robot with which the assembly of the overpressure valve according to the invention can be inserted into an associated surrounding construction. Advantageously, after a complete preassembly or finishing of the overpressure valve, a functional test including a leak tightness test can be performed, wherein these tests can be performed more easily and thus more economically due to the simplified testing or measurement construction after successful installation of the overpressure valve, for example, in a device.

Preferably, the overpressure valve according to the invention is suitable for use in a hydraulic tensioning device of a traction mechanism drive, in particular, a chain drive of an internal combustion engine. The preassembled and functionally tested overpressure valve can be pressed as one assembly, for example, into a receptacle of a tensioning piston or a housing of the tensioning device.

Especially high reliability of the overpressure valve according to the invention is achieved by a guide sleeve produced from a plastic. Through the guide sleeve that is also designated as a plastic cartridge and can be produced easily and economically, a wear-free guidance of the compression spring is realized. In addition, the stroke limiting device constructed as a dome-shaped recess on the end side for the compression spring of the guide sleeve made from plastic has a positive influence on the noise generation of the overpressure valve.

The guide sleeve according to the invention forms a sleeve base on which the compression spring is supported directly. By means of a discharge hole formed preferably centrally in the sleeve base, when the overpressure valve is opened, a partial flow of the hydraulic fluid can be discharged. Advantageously, the spring force and thus the opening pressure of the overpressure valve can be defined by means of a wall height of the sleeve base. In this context, the invention offers the ability to provide overpressure valves with different opening pressures that only differ through guide sleeves with different wall heights of the sleeve base and advantageously different colors.

In another construction of the invention, the housing of the overpressure valve comprises a dome-shaped base including a step. The step is offset in the axial direction relative to a central opening by means of which the closing body is loaded by a force from the compressed medium. In the area of a base, the step forms a valve seat defined for the closing body. The step causing an increase in the volume advantageously settles the incoming oil and also reduces the dynamic response of the closing body.

Preferably a ball is provided as the closing body that is guided ideally in the closed position on the stepped, dome-shaped base and in the open position in a dome-shaped receptacle of the guide sleeve forming a stroke-limiting device.

Furthermore, the function of the tensioning device can be improved by the overpressure valve according to the invention, because the overpressure valve is connected by means of a relatively short interference fit assembly to the tensioning piston or to a housing section of the tensioning device. This arrangement causes a gain in installation space, wherein a significantly longer main spring, which encloses the overpressure valve on the outside in some areas, can be used in the tensioning device. This longer spring advantageously improves the function of the tensioning device.

The overpressure valve according to the invention is preferably integrated as a preassembled assembly into a hollow tensioning piston of the tensioning device. To produce the tensioning piston that can move in the longitudinal direction in the tensioning device, an economical impact extrusion method is preferably used. As the material for the housing of the overpressure valve, preferably a sheet metal material is provided, wherein, in particular, a non-metal-cutting shaping or deep-drawing method is provided for production.

BRIEF DESCRIPTION OF THE DRAWINGS

Additional features of the invention can be found in the following description of the figures in which an embodiment of the invention is shown, wherein the invention is not limited to this embodiment. Shown herein are.

DETAILED DESCRIPTION OF THE PREFERRED EMBODIMENTS

Figure 1:
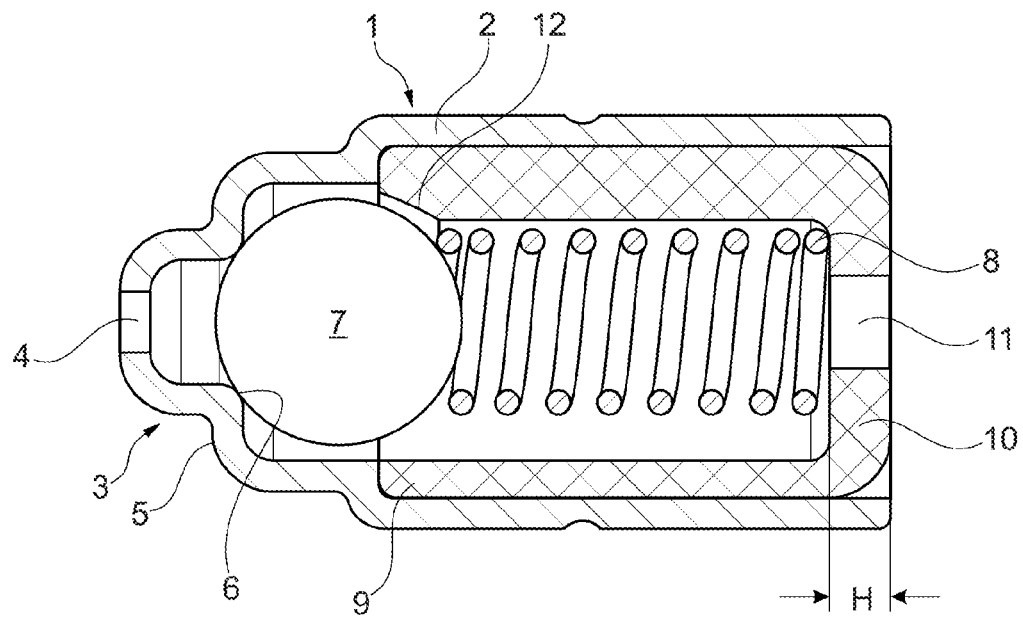
FIG. 1 an overpressure valve according to the invention in a longitudinal section, FIG. 2 the overpressure valve integrated in a piston of a tensioning device, and FIG. 3 a tensioning device in a longitudinal section with an associated overpressure valve according to the invention.

FIG. 1 shows a claimed embodiment of an overpressure valve 1 that includes a pot-shaped housing 2 formed as a deep-drawn part. A stepped, dome-shaped base 3 includes a central opening 4 through which hydraulic fluid can flow into the overpressure valve 1. On the inside, the base 3 forms, in the area of a step 5, a valve seat 6 for a closing body 7 formed as a ball. The closing body 7 is supported on the valve seat 6 with a force fit by means of a compression spring 8. For this purpose, the compression spring 8 is inserted into a guide sleeve 9 that is also to be called a plastic cartridge and supported on its sleeve base 10. An optimum, precise guidance of the closing body 7 is realized, on one hand, by means of a dome-shaped or convex receptacle or stroke limiting device 12 of the guide sleeve 9 and, on the other hand, by means of the stepped base 3 of the housing 2. The guide sleeve 9 is preferably pressed into the housing 2 with a force fit or alternatively fastened with a form fit. In this way, all of the individual parts of the overpressure valve 1 are joined as one assembly in a captive manner that is ensured against falling apart. Through a wall height H of the sleeve base 10, the spring force of the compression spring 8 and thus a supporting force of the closing body 7 on the valve seat 6 can be influenced. By means of a discharge hole 11 formed in the sleeve base 10, the hydraulic fluid discharged for equalization when the overpressure valve 1 is opened can be discharged.

Figure 2:
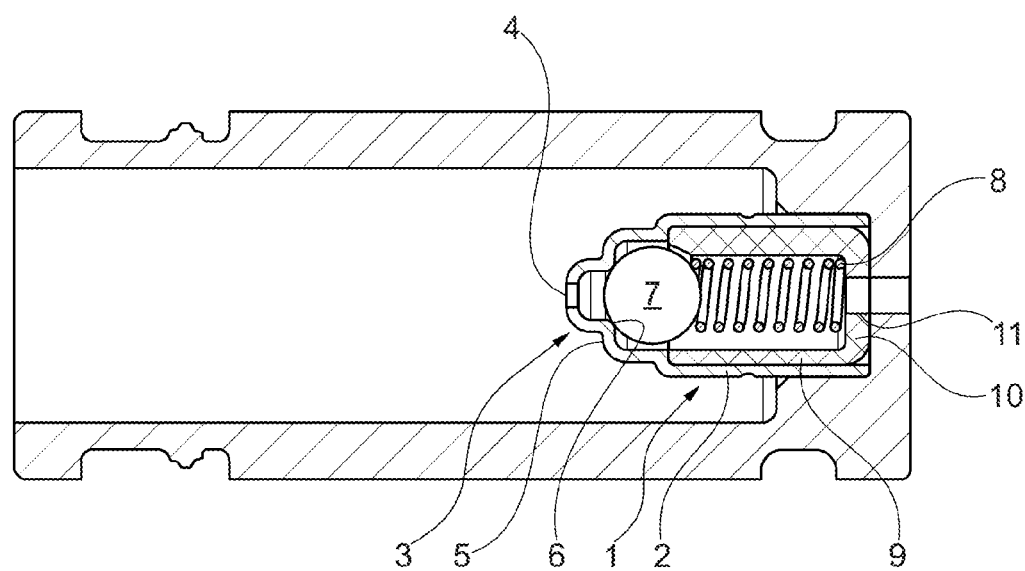

In FIG. 2, the overpressure valve 1 is shown in the assembled state. By means of an interference fit assembly 13, the overpressure valve 1 is fixed on the base side in a tensioning piston 14 of a tensioning device 15 shown in FIG. 3. Due to the relatively short interference fit assembly 13, a longer main spring 16 that improves the function of the tensioning device 15 can be used.

Figure 3:
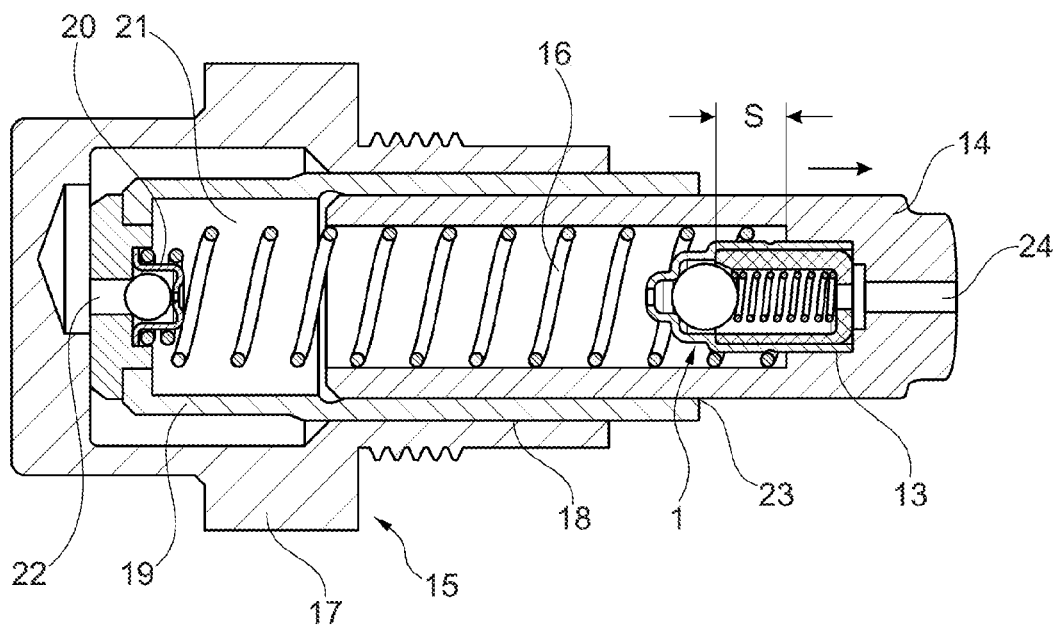

FIG. 3 shows a tensioning device 15 in connection with an overpressure valve 1 according to the invention integrated in the tensioning piston 14. The tensioning device 15 according to FIG. 3 is not realized by the protective scope of the invention. In a blind-hole-like hole 18 of a pipe-shaped tensioner housing 17 of the tensioning device 15, a socket 19 is inserted that is designed for receiving the guided tensioning piston 14 that can move in the longitudinal direction. On the base side, the socket 19 encloses a check valve 20. Furthermore, on the base of the socket 19, the main spring 16 formed as a helical compression spring is supported that loads the tensioning piston 14 on the opposite side in the direction of the arrow and exerts a load, for example, on a tensioning element of a chain drive not shown in FIG. 3. The main spring 16 surrounds, in the support area, the overpressure valve 1 inserted in the tensioning piston 14 by means of the interference fit assembly 13. Due to the relatively short interference fit assembly 13, a main spring 16 that is extended by the section S can be used. The socket 19 and the tensioning piston 14 limit a compression space 21 filled with a hydraulic fluid. An outward movement of the tensioning piston 14 increases the compression space 21 while simultaneously reducing the pressure, wherein the check valve 20 opens and hydraulic fluid flows into the compression space 21 via a feed hole 22.

If the tensioning piston 14 is moved in the opposite direction, the compression space 21 is reduced while increasing the pressure, wherein a partial flow of the hydraulic fluid is forced via a defined leakage gap 23 between the tensioner piston 14 and the socket 19. As soon as a pressure level in the compression space 21 exceeds an opening pressure of the overpressure valve 1, hydraulic fluid is discharged via the opening overpressure valve 1 into the passage opening 24.

LIST OF REFERENCE NUMBERS

1 Overpressure valve
2 Housing
3 Base
4 Opening
5 Step
6 Valve seat
7 Closing body
8 Compression spring
9 Guide sleeve
10 Sleeve base
11 Discharge hole
12 Stroke limiting device
13 Interference fit assembly
14 Tensioning piston
15 Tensioning device 16 Main spring
17 Tensioner housing
18 Hole
19 Socket
20 Check valve
21 Compression space
22 Feed hole
23 Leakage gap
24 Passage opening
H Wall height (guide sleeve)
S Section (helical compression spring)

The invention claimed is:

1. An overpressure valve in the form of a one-way valve or a check valve comprising a pot-shaped housing with a base and a central opening and a valve seat which interacts with a spring-loaded closing body, a guide sleeve inserted flush in the housing with a force fit or form fit such that a guide sleeve axial end face and a housing axial end face are aligned, the guide sleeve receives a compression spring which exerts a load on the closing body, said guide sleeve secures the overpressure valve together.

2. The overpressure valve according to claim 1, wherein the overpressure valve is a preassembled unit adapted for insertion into a tensioning device of a traction mechanism drive.

3. The overpressure valve according to claim 1, wherein the guide sleeve is made from a plastic, and includes, on one end side, a receptacle or stroke limiting device for the closing body and, on an opposite side, a discharge hole.

4. The overpressure valve according to claim 1, wherein the compression spring is supported on a sleeve base of the guide sleeve, and a wall height (H) of the sleeve base of the guide sleeve determines a pretensioning force of the compression spring.

5. The overpressure valve according to claim 1, wherein the base of the housing is dome-shaped and forms, in an area of a step, the valve seat for the closing body.

6. The overpressure valve according to claim 1, wherein a ball is provided as the closing body, and said ball is guided in a dome-shaped stroke limiting device of the guide sleeve or in a stepped section of the base.

7. A tensioner assembly including the overpressure valve according to claim 1, further comprising a tensioning device with a main spring, the main spring of the tensioning device surrounds the housing of the overpressure valve on an outside thereof up to a length of an interference fit assembly of the housing in the tensioning device.

8. The tensioner assembly according to claim 7, wherein the tensioning device further comprises a hollow tensioning piston, and the overpressure valve is integrated into the hollow tensioning piston of the tensioning device.

9. The overpressure valve according to claim 1, wherein the housing is a deep drawn part.

10. The overpressure valve according to claim 1, wherein the guide sleeve is held within the housing by the force fit or form fit without additional securing elements.

* * * * *